Patented Feb. 22, 1949

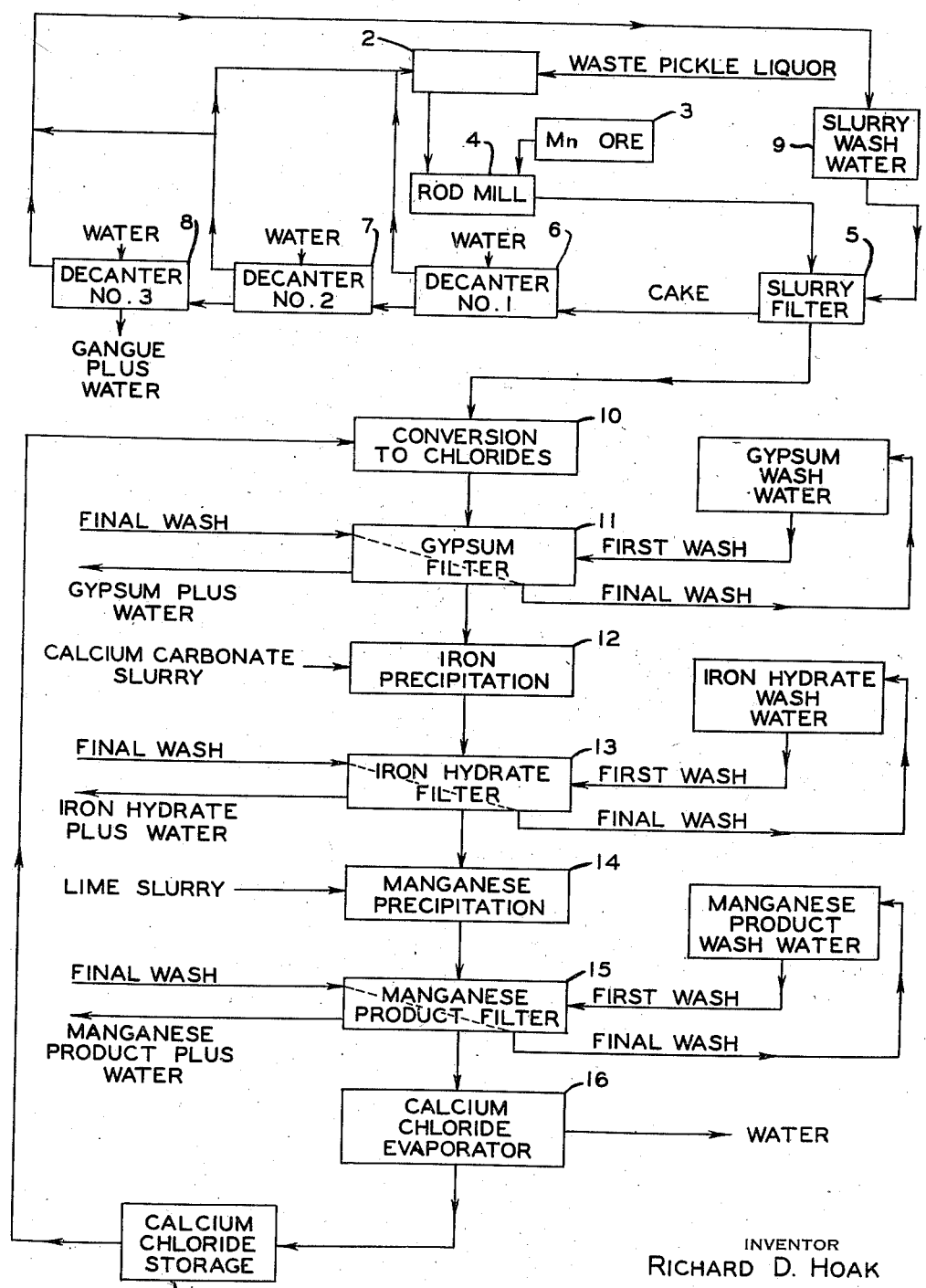

2,462,499

UNITED STATES PATENT OFFICE 2,462,499

PROCESS FOR RECOVERING MANGANESE VALUES FROM MANGANESE ORES

Richard D. Hoak, Mount Lebanon Township, Allegheny County, Pa., assignor to Mellon Institute of Industrial Research, Pittsburgh, Pa., a corporation of Pennsylvania Application September 27, 1947, Serial No. 776,505

9 Claims. (Cl. 23—87)

This invention relates to a process for recovering manganese from manganese ores. It relates more particularly to the recovery of manganese from low grade manganese ores containing manganese in such small amounts that the recovery of manganese by the usual smelting operation is uneconomical. While the invention is particularly useful in the treatment of low grade manganese ores containing, for example, 5 to 20% of manganese, it may be used in the treatment of ores of substantially higher grade containing manganese up to 35%.

Although low grade ores are abundant and are widely distributed, these ores have not been generally utilized because of the difficulty of recovering their manganese content in a combination practicable for conversion to various commercial uses. The most significant obstacle to the exploitation of these ores has been the lack of an economical method for separating iron, silica, alumina and other gangue minerals from the manganese.

Spent pickle liquor, a waste product of the steel industry, is produced in very large volume from the process whereby the oxide scale is removed from sheet steel and other steel products preparatory to the application of protective coatings or preparatory to further processing. This liquor is predominantly an aqueous solution of ferrous sulphate and free sulphuric acid which usually contains traces of other compounds dissolved from the oxide scale. The most significant other compound usually present is manganous sulphate. The composition of waste pickle liquor will normally fall within the limits of 10–20% $FeSO_4$ and 0.5% to 10% $H_2SO_4$. A liquor of composition similar to that of waste pickle liquor is produced in large volume in the manufacture of certain pigments, especially titanium dioxide. Some steel products are pickled with hydrochloric acid, for example, steel wire, and the resultant spent pickle liquor contains ferrous chloride and hydrochloric acid.

The economical disposal of waste pickle liquor constitutes a serious problem. In many cases no alternative remains but to treat the liquor with lime or some other alkaline reagent in order to prevent its discharge into streams where it would become an objectionable pollutant. This is an expensive procedure because no by-product of value is recovered. A process whereby waste pickle liquor can be employed profitably obviously is of public benefit.

One object of my invention is to provide a method whereby manganese can be recovered from low grade ores by utilizing waste pickle liquor which usually is disposed of only at considerable cost.

Another object of the invention is to provide a method for recovering manganese from low grade ores in the form of manganese hydrate or hydrated manganese oxide containing upwards of 60% of manganese as the metal, in which form the manganese is suitable for the production of ferro-manganese.

Another object is to provide a method for recovering manganese from low grade ores, the product obtained being in the form of pure hydrated manganous sulphate or pure hydrated manganous chloride.

Another object of the invention is the provision of a process whereby the sulphate content of waste pickle liquor is recovered in the form of hydrated calcium sulphate, $CaSO_4.2H_2O$, of extreme whiteness and high purity suitable for conversion to plasters, fillers and the like.

Another object of the invention is the provision of a process for recovering the iron content of waste pickle liquor in the form of ferric hydrate or hydrated ferric oxide, $Fe_2O_3.xH_2O$, suitable for conversion to pigments or which may be sintered and employed as part of a blast furnace charge.

The accompanying drawing is a flow sheet illustrating one embodiment of my process.

In the illustrated embodiment, the process involves the four following primary steps:

(1) Manganese ore is leached with spent pickle liquor and the gangue is filtered off and discarded;

(2) the clarified extract is treated with calcium chloride to convert manganous sulphate to manganous chloride and ferric sulphate to ferric chloride. The precipitated gypsum,

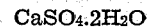

$CaSO_4.2H_2O$ is filtered off, washed and dried as a by-product;

(3) the filtrate from step (2) is treated with calcium carbonate slurry at a relatively low pH which causes the precipitation of ferric hydroxide, the manganous chloride remaining in solution. The ferric hydrate is filtered off, washed and dried as a by-product.

(4) the filtrate from step (3) is treated with lime slurry to precipitate the manganese as manganese hydroxide, $Mn(OH)_2$. The filtrate from this operation, primarily a solution of calcium chloride, is stored for reuse in step (2).

A typical manganese concentrate prepared by this process and suitable for use in the production of ferro-manganese contained 60.93% manganese and had the following analysis:

|  | Per cent |
|---|---|
| Manganese dioxide, $MnO_2$ | 34.48 |
| Manganese oxide, MnO | 50.90 |
| Iron oxide and alumina, $R_2O_3$ | 3.10 |
| Phosphorus | Nil |
| Calcium hydroxide, $Ca(OH)_2$ | 0.83 |
| Magnesium hydroxide, $Mg(OH)_2$ | 0.65 |
| Silica, $SiO_2$ | 1.84 |
| Moisture | 8.10 |
|  | 99.90 |

The ore which was treated to produce this concentrate had the following analysis:

|  | Per cent |
|---|---|
| Manganese | 14.72 |
| Iron | 34.37 |
| Silica | 15.80 |
| Alumina | 4.06 |
| Phosphorus | 0.27 |
| Moisture | 4.83 |

Manganese usually occurs in ores as the dioxide $MnO_2$ and this compound is most adaptable to treatment by this process. Manganic oxide, $Mn_2O_3$, can be treated efficiently but its use decreases the quantity of iron hydrate produced as a by-product. Combinations of manganese oxides can be treated but as the proportion of the monoxide increases, the efficiency of extraction decreases. However, little manganese monoxide, MnO, exists as such in nature. This invention however is not limited to oxide ores since other ores, notably manganese carbonate ores, can be made susceptible to this process by subjecting the ores to a preliminary oxidizing roast.

When waste pickle liquor reacts with a manganese ore in which the manganese is present predominantly as the dioxide the reaction is expressed by the equation:

(1) $MnO_2 + 2FeSO_4 + 2H_2SO_4 =$
$MnSO_4 + Fe_2(SO_4)_3 + 2H_2O$

When the manganese of the ore is present predominantly as manganic oxide, the reaction is expressed by the equation:

(2) $Mn_2O_3 + 2FeSO_4 = 2MnSO_4 + 2Fe(OH)_3$

Where a low grade manganese ore is leached with waste pickle liquor the operation is preferably performed in a ball-mill or a rod-mill. However, any device which will serve to bring the ore and the liquor into intimate contact, such as a vessel equipped with an agitator, may be used, although the rate of extraction may be lower than when the ore is ground with the liquor. The finer the initial stage of subdivision of the ore, the higher will be the extraction of the manganese but this is not a critical factor and the degree of the grinding will be determined by economic considerations. The proportion of waste pickle liquor which is required to leach a low-grade ore in which the manganese is predominantly present as the dioxide may be determined from Equation 1 basing the calculation on the ferrous sulphate alone. The actual reaction generally requires less sulphuric acid than is indicated by Equation 1, and the average waste pickle liquor (approximately 15% $FeSO_4$, 5% $H_2SO_4$) contains sufficient free acid to provide efficient extraction. The waste pickle liquor required by a predominantly manganic oxide ore can similarly be determined from Equation 2.

Manganese ores may contain a variety of manganese oxides, and the proportion of ferrous sulphate to sulphuric acid in the leach liquor is best determined by a series of trial extractions. This is so because of the difficulty of establishing the presence of specific oxides by chemical analysis alone. For example, there is a simple analytical procedure for determining the dioxide and the monoxide of manganese in an ore, but the analysis cannot distinguish between manganic oxide, $Mn_2O_3$, and the dioxide, $MnO_2$, and monoxide, MnO, present in such proportions as to be equivalent to manganic oxide, thus, $MnO.MnO_2$. Similarly, manganic oxide will dissolve in dilute sulphuric acid with the formation of manganous sulphate and the precipitation of manganese dioxide as shown by Equation 3:

(3) $Mn_2O_3 + H_2SO_4 = MnSO_4 + MnO_2 + H_2O$

The dioxide will react with any ferrous sulphate present, in accordance with Equation 1. Some manganic oxide, however, may react directly with ferrous sulphate as shown in Equation 2. In theory, it should be possible to combine all of these hypothetical reactions into one summation equation which would express the result which would have been obtained had the composition of the leaching liquor been calculated on the two oxides distinguished in the ore by chemical analysis. In practice, however, the reactions are so complex that a series of trial extractions will yield the necessary information more promptly than any theoretical approach.

Referring to the accompanying drawing, waste pickle liquor 2 and manganese ore 3 are fed to a rod-mill 4 where they are ground and the slurry is filtered on a filter 5. The character of the slurry produced in the leaching operation will vary somewhat with the type of ore and the concentration of the waste pickle liquor used as an extractive. The slurry will contain manganous sulphate in solution with variable proportions of ferrous sulphate and ferric sulphate in solution, the ore gangue and any ferric hydroxide which may have been precipitated. The liquor may be separated from the sludge by any conventional means. If rotary vacuum filtration is employed, a filter aid may be required with some sludges to provide a satisfactory filtration rate. The sludges usually settle at such a rate that washing by decantation is feasible. The drawing indicates both filtration and decantation, but obviously the kind and degree of washing will depend upon economic factors. It is desirable that the volume of wash water be kept at a minimum, consistent with economical manganese recovery from the sludge, to reduce the quantity of water to be evaporated later. The drawing indicates a method whereby wash water may be kept at a minimum through storage of weak wash water for reuse as a first wash. The filter cake from the filter 5 is transferred to a decanter 6 where it is agitated with water, the solids allowed to settle and the solution is returned to the waste pickle liquor tank 2. Two other decanters 7 and 8 may be employed and the solution from the decanter 8 returned to the wash water container 9 from which it is fed to the filter 5.

The clarified extract from the filter 5 is conveyed to a container 10 and is treated with a solution of calcium chloride to convert the manganous sulphate to manganous chloride and the ferric sulphate to ferric chloride. This reaction is represented by Equation 4:

(4) $MnSO_4 + Fe_2(SO_4)_3 + 4CaCl_2 \rightarrow MnCl_2 + 2FeCl_3 + 4CaSO_4$

The calcium sulphate, $CaSO_4.2H_2O$, which precipitates is filtered on a rotary vacuum filter 11. It filters rapidly and can be produced practically chemically pure by suitable washing with very dilute hydrochloric acid solution. This product is very white and is suitable for use as paint extenders, fillers and similar purposes or it can be processed to make gypsum plaster.

The filtrate from the filter 11 is passed to an iron precipitator 12. The solution fed to the precipitator contains manganous chloride and ferric chloride and perhaps some ferrous chloride. The removal of iron is based on the relation between the pH values at which the ions of ferric iron, ferrous iron, and manganous manganese precipitate. Ferric iron can be removed completely from an aqueous solution by raising the pH thereof to a value between about 3.0 and 4.0, the actual value depending to some extent on the presence of other dissolved salts. Manganese does not begin to precipitate until the pH increases to about 8.5. This wide range in pH provides a means for accomplishing a sharp separation of the two metal ions. In practice, however, it is difficult to add an alkaline agent so slowly that the pH will not rise momentarily in localized areas to a somewhat higher value than the average for the whole solution. From this it will be apparent that the higher the average pH of the solution, the greater is the danger of inadvertently precipitating some manganese with further increments of alkaline agent. Where ferrous iron is present in excessive amount, it also will be precipitated, and the presence of this ion increases the danger of coprecipitating manganese. However, ferrous iron does not precipitate until the pH is raised to about 5.5. For these reasons, it is desirable to use calcium carbonate as the precipitant for iron because a pH higher than 7 to 7.5 cannot ordinarily be obtained with this compound. Also the smallest excess of ferrous sulphate consistent with efficient manganese extraction should be used in the leaching solution to keep the concentration of ferrous iron in the extract as low as possible. This usually means that the concentration of ferrous iron in the extract should not exceed approximately 1 gram per liter. Although the manganese which it may be permitted to lose in the iron separation step will be determined by economic factors, the pH usually should not be allowed to rise above 4.0 in the iron precipitation operation. The reaction representing the precipitation of iron is shown in Equation 5:

(5) $2FeCl_3 + 3CaCO_3 + 3H_2O \rightarrow 2Fe(OH)_3 + 3CaCl_2 + 3CO_2$

The iron hydroxide which is precipitated is separated on a filter 13. It filters readily and with thorough washing a product of high quality suitable for pigments can be made. If desired, this product can be sintered to produce a rich blast furnace burden.

The filtrate from the iron removal step consists essentially of an aqueous solution of manganous chloride and calcium chloride. It is treated in a manganese precipitator 14 with a slurry of high calcium lime with rapid agitation but with the exclusion of air insofar as possible until the pH rises to about 8.5–10, preferably about 9.5 where the manganese precipitates completely as manganese hydrate or hydrated manganese oxide. Air is excluded in this step to reduce oxidation of the freshly precipitated manganous hydrate, $Mn(OH)_2$, to manganese dioxide, $MnO_2$. The precipitation of manganous hydroxide is represented by Equation 6:

(6) $MnCl_2 + Ca(OH)_2 = Mn(OH)_2 + CaCl_2$

Addition of an excess of lime at this point is undesirable because any excess will appear in the manganese hydrate. Portions of the slurry should be filtered toward the end of the precipitation step and tested for manganese and only enough lime should be added to effect complete precipitation. The manganese hydroxide can be filtered and washed readily on a rotary vacuum filter 15. The dried manganese hydroxide produced in this manner will contain from 60 to 62% manganese as the metal. Heating the product to drive off combined water results in a product containing from 62 to 64% manganese. The clear filtrate from the filter 15 is essentially a solution of calcium chloride which after evaporation of excess water in evaporator 16 can be passed to a storage tank 17 and from there be recycled to the converter 10 for converting more manganese and iron sulphates into chlorides.

The process thus far described results in the production of manganese hydroxide, or if some air is present during the precipitation of manganese hydroxide the product may be partly a hydrated manganese dioxide. Where the production of pure manganous sulphate is desired, the filtered extract from Equation 1 can be treated with a slurry of high calcium lime or with dry pulverized high calcium limestone until its pH is increased to about 3.5–4.5 in order to precipitate ferric hydroxide and calcium sulphate. The precipitate is then filtered off and the solution of manganous sulphate can be run to a crystallizer where water is evaporated to form manganous sulphate tetrahydrate, $MnSO_4.4H_2O$. In a similar manner, if pure manganous chloride is desired, iron can be precipitated in the same manner from the filtered chloride liquor of Equation 4 and the solution of manganous chloride run to a crystallizer where water is evaporated to form manganese chloride tetrahydrate, $MnCl_2.4H_2O$.

The process has been described particularly as applied to the treatment of low manganese ores with waste ferrous sulphate pickle liquor since by far the greatest tonnage of steel which is pickled is pickled with sulphuric acid. However, some steel products, for example, steel wire, are pickled with hydrochloric acid and the resultant spent pickle liquor contains ferrous chloride and hydrochloric acid. According to my process I can employ either the spent sulphate pickle liquor or the spent chloride pickle liquor. In fact, from the standpoint of ease in carrying out the process the chloride pickle liquor has certain advantages over the sulphate pickle liquor, since the use of chloride pickle liquor avoids the necessity of converting the sulphates to chlorides in step (2) of the process. In carrying out the process employing the chloride pickle liquor, the reaction represented by Equation 4 can be omitted. The process, except for the omission of the reaction represented by Equation 4, is identical with that described in connection with the use of sulphate pickle liquor.

The invention is not limited to the preferred embodiment but may be otherwise embodied or practiced within the scope of the following claims.

I claim:

1. In the process of recovering manganese from manganese ores, the steps comprising leaching the ore with an aqueous acidic ferrous sulphate solution, removing the solids, mixing the extract containing manganous sulphate and ferric sulphate with calcium chloride solution, thereby precipitating calcium sulphate, removing the calcium sulphate, raising the pH of the filtrate containing manganous chloride and ferric chloride to about 3.0–4.0, thereby precipitating ferric hydroxide, removing the precipitate, raising the pH of the filtrate containing manganese chloride in solution to about 8.5–10, thereby precipitating manganese hydroxide, and recovering the precipitate.

2. A process according to claim 1, wherein air is excluded substantially completely during the step of precipitating manganese hydroxide at pH about 8.5–10.

3. A process according to claim 1, wherein the extract obtained by leaching the ore and containing manganous sulphate and ferric sulphate in solution contains not over about 1 gram per liter of ferrous iron.

4. In the process of recovering manganese from manganese ores, the steps comprising leaching the ore with an aqueous acidic solution of a ferrous salt of the group consisting of ferrous sulphate and ferrous chloride, removing the solids, raising the pH of the extract containing the corresponding salts of manganous manganese and ferric iron to about 3.0–4.0, thereby precipitating ferric hydroxide, removing the precipitate and crystallizing the manganese salt from the filtrate.

5. In the process of recovering manganese from manganese ores, the steps comprising leaching the ore with an aqueous acidic ferrous sulphate solution, removing the solids, mixing the extract containing manganous sulphate and ferric sulphate with calcium chloride solution, thereby precipitating calcium sulphate, removing the calcium sulphate, raising the pH of the filtrate containing manganous chloride and ferric chloride to about 3.0–4.0, thereby precipitating ferric hydroxide, removing the precipitate and crystallizing manganese chloride from the filtrate.

6. In the process of recovering manganese from manganese ores, the steps comprising leaching the ore with an aqueous acidic solution of a ferrous salt of the group consisting of ferrous sulphate and ferrous chloride, removing the solids, raising the pH of the extract containing the corresponding salts of manganous manganese and ferric iron to about 3.0–4.0, thereby precipitating ferric hydroxide, removing the precipitate, and recovering a manganese product from the filtrate.

7. In the process of recovering manganese from manganese ores, the steps comprising leaching the ore with an aqueous acidic ferrous sulphate solution, removing the solids, mixing the extract containing manganous sulphate and ferric sulphate with calcium chloride solution, thereby precipitating calcium sulphate, removing the calcium sulphate, raising the pH of the filtrate containing manganous chloride and ferric chloride to about 3.0–4.0, thereby precipitating ferric hydroxide, removing the precipitate, and recovering a manganese product from the filtrate.

8. In the process of recovering manganese from manganese ores, the steps comprising leaching the ore with an aqueous acidic ferrous chloride solution, removing the solids, raising the pH of the extract containing manganous chloride and ferric chloride to about 3.0–4.0, thereby precipitating ferric hydroxide, removing the precipitate, and recovering a manganese product from the filtrate.

9. In the process of recovering manganese from manganese ores, the steps comprising leaching the ore with an aqueous acidic ferrous chloride solution, thereby producing a liquor containing manganous chloride and ferric chloride in solution, removing the solids, raising the pH of the filtrate to about 3.0–4.0, thereby precipitating ferric hydroxide, removing the precipitate, raising the pH of the filtrate containing manganese chloride in solution to about 8.5–10, thereby precipitating manganese hydroxide, and recovering the precipitate.

RICHARD D. HOAK.

No references cited.